US011473000B2

(12) United States Patent
Jamison et al.

(10) Patent No.: US 11,473,000 B2
(45) Date of Patent: Oct. 18, 2022

(54) INSULATING FLUIDS CONTAINING POROUS MEDIA

(71) Applicant: Halliburton Energy Services, Inc., Houston, TX (US)

(72) Inventors: Dale E. Jamison, Humble, TX (US); William Walter Shumway, Spring, TX (US); Xiangnan Ye, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 342 days.

(21) Appl. No.: 16/605,875

(22) PCT Filed: Dec. 7, 2018

(86) PCT No.: PCT/US2018/064454
§ 371 (c)(1),
(2) Date: Oct. 17, 2019

(87) PCT Pub. No.: WO2020/117268
PCT Pub. Date: Jun. 11, 2020

(65) Prior Publication Data
US 2021/0246356 A1 Aug. 12, 2021

(51) Int. Cl.
| C09K 8/518 | (2006.01) |
| C09K 8/502 | (2006.01) |
| C09K 8/514 | (2006.01) |
| E21B 17/01 | (2006.01) |
| E21B 36/00 | (2006.01) |

(52) U.S. Cl.
CPC ............. *C09K 8/518* (2013.01); *C09K 8/502* (2013.01); *C09K 8/514* (2013.01); *E21B 17/01* (2013.01); *E21B 36/003* (2013.01)

(58) Field of Classification Search
CPC .......... C09K 8/38; C09K 8/502; C09K 8/514; C09K 8/518; C09K 8/92; C09K 8/94; E21B 17/01; E21B 36/003
See application file for complete search history.

(56) References Cited

U.S. PATENT DOCUMENTS

| 5,065,820 A | 11/1991 | Bloys et al. |
| 6,225,361 B1 | 5/2001 | Nakajima |
| 6,302,207 B1 * | 10/2001 | Nguyen ................... C09K 8/56 166/278 |

(Continued)

OTHER PUBLICATIONS

Engineers Edge, Thermal Conductivity of Liquids, 4 pages. Printed Feb. 24, 2022 (Year: 2022).*

(Continued)

*Primary Examiner* — Alicia Bland
(74) *Attorney, Agent, or Firm* — Conley Rose, P.C.; Rodney B. Carroll (57) ABSTRACT

Insulating fluids for use in drilling, production, and other applications are provided, the insulating fluids containing a porous medium (such as a sponge or foam) to limit the mobility of the liquid phase of the insulating fluid. The porous medium in the insulating fluid provides a mechanical means for reducing convective heat transfer, as the small pore spaces within the porous media create tortuous paths for the liquid moving therethrough. Methods include introducing the insulating fluid into an annulus of a drilling, riser, production, packer, or pipeline assembly to reduce heat transfer therethrough.

15 Claims, 3 Drawing Sheets

(56) References Cited

U.S. PATENT DOCUMENTS

| | | | |
|---|---|---|---|
| 7,625,845 | B2 | 12/2009 | Wang et al. |
| 7,713,917 | B2 | 5/2010 | Wang et al. |
| 7,863,223 | B2 | 1/2011 | Leggett et al. |
| 7,923,419 | B2 | 4/2011 | Qu et al. |
| 8,236,736 | B2 | 8/2012 | Leggett et al. |
| 8,381,813 | B2 | 2/2013 | Diaz et al. |
| 9,140,119 | B2 | 9/2015 | Deen |
| 9,410,402 | B2 | 8/2016 | Wang et al. |
| 9,523,028 | B2 | 12/2016 | McKennis et al. |
| 2004/0076478 | A1* | 4/2004 | Legras .................... E21B 17/18 |
| | | | 405/224.2 |
| 2008/0064804 | A1 | 3/2008 | Tej et al. |
| 2008/0113883 | A1 | 5/2008 | Wang et al. |
| 2008/0223596 | A1 | 9/2008 | Ezell et al. |
| 2008/0224087 | A1 | 9/2008 | Ezell et al. |
| 2008/0227665 | A1 | 9/2008 | Ezell et al. |
| 2011/0305830 | A1 | 12/2011 | Frantz et al. |
| 2013/0213656 | A1 | 8/2013 | Ezell |
| 2015/0275600 | A1* | 10/2015 | Wang ..................... E21B 37/00 |
| | | | 166/267 |
| 2016/0201433 | A1 | 7/2016 | Kalgaonkar et al. |
| 2016/0222274 | A1 | 8/2016 | Hoskins |

OTHER PUBLICATIONS

International Preliminary Report on Patentability issued in related PCT Application No. PCT/US2018/064454 dated Jun. 17, 2021, 10 pages.

International Search Report and Written Opinion issued in related PCT Application No. PCT/US2018/064454 dated Sep. 6, 2019, 13 pages.

* cited by examiner

INSULATING FLUIDS CONTAINING POROUS MEDIA

CROSS-REFERENCE TO RELATED APPLICATION

The present application is a U.S. National Stage Application of International Application No. PCT/US2018/064454 filed Dec. 7, 2018, which is incorporated herein by reference in its entirety for all purposes.

BACKGROUND

The present disclosure relates to insulating fluids and methods for servicing a well system.

Insulating fluids are often used in well operations wherein the fluid is placed into an annulus between a first tubing and a second tubing (or the walls of a wellbore). The insulating fluid acts to insulate a first fluid (e.g., a hydrocarbon fluid) that may be located within the first tubing from the environment surrounding the first tubing or the second tubing to enable optimum recovery of the hydrocarbon fluid. For instance, if the surrounding environment is very cold, the insulating fluid is thought to protect the first fluid in the first tubing from the environment so that it can efficiently flow through the production tubing, e.g., the first tubing, to other facilities. This is desirable because heat transfer can cause problems such as the precipitation of heavier hydrocarbons, severe reductions in flow rate and, in some cases, casing collapse. Additionally, when used in packer applications, a required amount of hydrostatic head pressure is needed. Thus, higher density insulating fluids are often used to provide the requisite hydrostatic force.

Such fluids also may be used in applications involving pipelines for similar purposes, e.g., to protect a fluid located within the pipeline from the surrounding environmental conditions so that the fluid can efficiently flow through the pipeline. Insulating fluids can be used in other insulating applications as well wherein it is desirable to control heat transfer. These applications may or may not involve hydrocarbons.

Conventional insulating fluids often incorporate one or both of the following aspects. The insulating fluid can be a composition with low thermal conductivity to reduce heat transfer therethrough. These insulating fluids sometimes include a viscosifier to reduce or prevent convection currents therethrough. In addition to, or in lieu of, a low thermal conductivity composition, insulating fluids can have a means of gelling the fluid to stop convection currents. Specifically, materials added to the insulating fluid may react or hydrate to form a gel network within the insulating fluid to stop convection currents, thereby reducing convective heat transfer through the fluid. However, existing insulating fluids used in oil and gas environments may not be sufficiently robust in some applications, as they often require weighting agents, application in a specific fluid environment (e.g., oil, water, or brine based), and/or gelling agents that are activated within a limited temperature range. In addition, existing insulating fluids, since they are multi-component fluids, may be susceptible to failure due to chemical contamination.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for servicing well systems. More particularly, the present disclosure relates to insulating fluids containing porous media that may be useful in risers, packers, pipelines, or any other system where controlling convection currents can present an advantage.

Minimizing the naturally occurring convection currents in insulating fluids used in well risers, production tubing, pipelines, and other heat transfer situations can improve the insulating efficiency of the fluid. Typically, insulating fluids are viscosified or gelled to minimize such convection currents. However, the products used to manage the rheology of the insulating fluids can add significant cost to the insulating method. In some cases, the rheology of the insulating fluid can be difficult to control depending on the fluid type and desired fluid density. For example, certain insulating fluids can only be gelled within a particular temperature range, while others can only be weighted by particular types of agents (e.g., brines, or monovalent salts). This disclosure provides a method to minimize the convection currents in an insulating fluid useful in drilling and production situations independently of, in addition to, or, in some cases, without the use of any rheology modifying additives.

The present disclosure provides insulating fluids for use in drilling, production, and other applications, the insulating fluids containing a porous medium (such as a sponge or foam) that can limit the mobility of the liquid phase of the insulating fluid. The porous medium in the insulating fluid provides a mechanical means for reducing convective heat transfer, as the small pore spaces within the porous media create tortuous paths for the liquid moving therethrough. The porous media can reduce or eliminate natural convection currents in fluids by creating these tortuous pathways for the currents. Minimizing the velocities of convection currents via the porous media minimizes the overall heat transfer through the insulating fluid. The disclosed insulating fluid may be introduced into at least a portion of a drilling or production assembly, inter alia, to reduce heat transfer therethrough.

Among the many potential advantages to the methods and compositions of the present disclosure, only some of which are alluded to herein, the methods, compositions, and systems of the present disclosure may provide improved insulation of risers, packers, and pipelines, inter alia, because the porous media in the insulating fluid acts as a mechanical barrier to convection currents that might otherwise move through the fluid. Since the mechanical barrier to convection currents is already provided by the structure of the porous media, the insulating fluids disclosed herein may not require any thermal or chemical activation to be effective. As such, the insulating fluids may be used in a wide range of drilling, production, or pipeline environments with a low failure rate. The porous media are effective at reducing convection currents regardless of any amount of chemical contamination within the insulating fluids. The insulating fluids containing such porous media may be oil-based, water-based, or brine-based without affecting the ability of the porous media to reduce convection currents. Still further, the disclosed insulating fluid may be functional for reducing convection currents without significant delay after it is mixed, since the porous media relies on mechanical flow dynamics rather than chemical gelation to limit convection currents in the fluid.

The disclosed insulating fluids may be relatively low cost compared to certain existing insulating fluids, as they do not rely on multi-part chemical constituents that are activated under specific conditions. There is also a reduced cost to weight up the disclosed insulating fluids. The insulating fluid may be reusable, as the fluid can be easily removed or pumped from the well and recaptured and/or recycled due to its relatively low viscosity. The porous media can be screened or otherwise separated from the base fluid and reused with other base fluids for other drilling, production, or pipeline applications, and the separated base fluid may be reused as well.

In certain embodiments, the insulating fluid may include a porous medium. As used herein, the term "porous medium" or "porous media" refers a solid that is characterized by having a matrix structure with a plurality of open cells formed therethrough. Examples of porous media suitable for certain embodiments of the present disclosure include, but are not limited to a foam, a sponge, and any combination thereof. In some embodiments, the foam may be a reticulated foam. In some embodiments, the reticulated foam may be constructed from a synthetic material. Examples of synthetic materials suitable for us in the reticulated foam include, but are not limited to, polymers or copolymers composed of polyurethane, polyether, polyester, polyimide, glass fiber, polyolefin, polystyrene, and any copolymers, derivatives, or combinations thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "derivative" also includes copolymers, terpolymers, and oligomers of the listed compound. The material properties of such reticulated foam enable its use at elevated temperatures in both oil-based and water-based fluids. In some embodiments, the porous medium may be a cellulosic sponge. In some embodiments, the porous material may include a degradable polymer. Examples of degradable polymers that may be suitable for certain embodiments of the present disclosure include, but are not limited to poly(lactic acid); polyhydroxyalkanoate, polyglycolic acid, polyol, poly(ortho ester); polybutylene succinate; polybutylene succinate-co-adipate; polyhydroxybutyrate-valerate; polyhydroxybutyrate-co-valerate; polycaprolactone; polyester amide; a starch-based polymer; polyvinyl alcohol; an aliphatic aromatic copolyester; and any combination thereof.

The porous media of the present disclosure may be prepared by any suitable methods, and may be sourced from commercially available materials. In certain embodiments, the porous medium could be a 3-D printed material. In certain embodiments, the porous medium may be a reticulated polyurethane foam such as BARALOCK®-666 (foam material, available from Halliburton Energy Services, Inc.). Although BARALOCK®-666 has conventionally been used for lost circulation materials, the foam material may provide an effective barrier to convection currents when applied in areas where insulation is desired, including risers, packers, pipelines, and the like.

The porous medium can have a pore size corresponding to the size of one or more open cells formed in the porous medium. In some embodiments, the open cells in the porous medium may have roughly the same pore size throughout. In other embodiments, the pore sizes of the open cells in the porous medium may be varied. In certain embodiments, the porous medium may have a pore size in the range of about 5 pores per inch (PPI) to about 100 PPI, or alternatively about 10 PPI to about 80 PPI, or alternatively about 20 PPI to about 50 PPI. In some embodiments the pore sizes within the porous medium may have a multi-modal distribution, where certain open cells have a first smaller pore size and other open cells have a second larger pore size.

In certain embodiments, the insulating fluid may include a plurality of independent components made from a porous medium disposed in the base fluid. In some embodiments, the porous components may each be constructed of the same material (or porous medium). In other embodiments, some porous components may be constructed from a first type of material (or porous medium) while other porous components are constructed from a second type of material (or porous medium). The individual porous components in the insulating fluid can each have a component shape and a component size. The component shape and/or size of the porous components may be roughly the same for each porous component. In other embodiments, the porous components may have varying component shapes (e.g., regular or irregular shapes) and/or sizes. For example, the shapes and/or sizes of the porous component may follow a multi-modal distribution. Examples of porous component shapes suitable for certain embodiments of the present disclosure may include, but are not limited to, cubic, prismatic, wedge, triangular, spherical, conical, cylindrical, amorphous, and combinations thereof. The one or more porous components in the insulating fluid may have a cubic shape with dimensions of about 0.5 inch to about 1.0 inch. However, the one or more porous components may have other shapes and/or sizes depending on the application.

In certain embodiments, the porous medium may be modified via one or more materials disposed on at least a portion of an outer surface of the porous medium. The additional material(s) may be applied to change the size of the open cells in the porous medium, or to tailor the specific gravity of the porous medium so that the components thereof are well dispersed in the base fluid. Examples of materials that may be disposed on at least a portion of an outer surface of the porous medium may include, for example, calcium carbonate, iron phosphate, calcium phosphate, calcium sulfate, silica, or others.

Materials such as calcium carbonate or other minerals disposed on an outer surface of the porous medium may be distributed in any fashion or form (e.g., as a coating or film, or as distinct clusters or small masses of crystals), and may be disposed on the outer surface of the porous medium in any amount. In some embodiments, the outer surface of the porous medium may be at least partially coated with calcium carbonate and/or another mineral, or may be substantially entirely or entirely coated with calcium carbonate and/or another mineral. The calcium carbonate and/or another mineral may be placed on the porous medium by any suitable means of deposition. For example, in some embodiments, the calcium carbonate and/or another mineral may be deposited via various precipitation techniques.

Variations in the process of depositing calcium carbonate and/or another mineral on the porous medium may yield different sizes and/or morphologies of crystals, as well as different coverages or concentrations of the mineralcoating on the porous medium. For example, the time and rate of precipitation of the calcium carbonate may be adjusted to provide a concentration or coverage of calcium carbonate within a desired range. Different deposition methods may result in different crystal morphologies of the resultant precipitated calcium carbonate (e.g., calcite crystals vs. aragonite crystals). Variations in temperature during the deposition process may change the morphology of the calcium carbonate deposited on the porous medium.

Coating the porous medium with calcium carbonate (or some other mineral) may enable tailoring the specific gravity of the porous medium. For example, coating at least a portion of the porous medium with calcium carbonate (or some other mineral) may increase the density of the porous components so that they do not float at the top of the base fluid when added. Precipitation of calcium carbonate (or other minerals) on the porous medium may allow the porous medium to be manufactured to have a similar specific gravity to that of the base fluid of the insulating fluid. With the specific gravity of the porous medium roughly equal to that of the base fluid, there is no need to suspend the components of porous media in the base fluid, even with base fluids including pure un-viscosified brines, oils, and the like. Tailoring the specific gravity of the porous media to match that of the base fluid also may facilitate mixing the porous components into the base fluid. With the ability to design the porous medium specific gravity relative to the base fluid specific gravity, a wide range of opportunities for tailoring the mechanical properties of the porous medium may be realized. Additionally, tailoring the specific gravity of the porous medium to that of the base fluid is useful in applications when other fluids will be mixed with the base fluid and/or in the design of high density insulating fluids.

In certain embodiments, the porous medium (uncoated or coated) used in the disclosed insulating fluids may have a density of from about 1.0 g/cm$^3$ to about 1.4 g/cm$^3$. The porous medium may reach a density of about 1.0 g/cm$^3$ to about 1.6 g/cm$^3$ via precipitation of calcium carbonate on the base porous material. A bulk density of the porous medium (uncoated) may be about 1.8 lb/ft$^3$, while a bulk density of the porous medium with a coating may be about 3.0 lb/ft$^3$.

Coating the porous medium with calcium carbonate (or some other mineral) may also increase the impedance to convection currents offered via the resulting insulating fluids. Specifically, the precipitation of additional material onto the porous medium makes the pore size of the resulting porous medium smaller, thereby creating a more tortuous path through which the convection currents will be moving. The increased impedance to convection currents will affect heat transfer through the insulating fluid by increasing flow resistance through the porous medium.

In certain embodiments, the calcium carbonate (or some other mineral) may be applied to outer surfaces of the porous medium until the calcium carbonate entirely covers the base material of the porous medium. This may include covering all or substantially all portions of the porous medium, including those that define open cells within the porous medium. As a result, the porous medium may include a base porous matrix material with every or substantially every exposed surface covered by calcium carbonate. The calcium carbonate may retain the mechanical structure of the porous medium in the event the porous medium is used in a drilling, production, pipeline, etc. location where the temperature exceeds the melting point of the matrix material. In such instances, the base foam or sponge may at least partially melt away, leaving the exoskeleton shell of the porous material in the form of calcium carbonate to maintain mechanical impedance to convection currents.

The insulating fluids used in the methods and systems of the present disclosure may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In some embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional porous media transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents and other additives, if any, included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons (e.g., diesel, mineral oil, or linear olefins and paraffins), organic liquids, and the like. In certain embodiments, the insulating fluids may include a mixture of one or more fluids and/or gases, including but not limited to emulsions (e.g., invert emulsions), foams, and the like. In an embodiment, the amount of base fluid present in the treatment fluid may be from about 50 to about 95 percent by weight (wt. %) of the treatment fluid, alternatively, from about 70 wt. % to about 90 wt. %, alternatively, from about 70 wt. % to about 85 wt. %.

In certain embodiments, the base fluid of the insulating fluid is chosen, or adjusted, to have a relatively low thermal conductivity. The base fluid may have a thermal conductivity of about 0.12 Watts per meter Kelvin, or W/mK (for an oil base) to about 0.6 W/mK (for a brine base). In some embodiments, a pure fluid, such as a brine, oil, or glycol may be used as the base fluid. As mentioned above, the disclosed porous medium may be used with any desired base fluid to form an insulating fluid, including water-based, brine-base, and oil-based fluids.

In certain embodiments, the porous medium of the present disclosure may include a compressed material. As used herein, "compressed material" refers to a porous material that is in a compressed state. In some embodiments, the compressed material may be expandable. The porous medium may be delivered to a desired insulating location within a riser, packer, pipeline, or other system in a compressed form for easier transportation, and then expanded to provide increased impedance to convection currents.

The porous media of the present disclosure may be included in an insulating fluid of the present disclosure in any amount suitable to form a barrier of tortuous pathways (defined by the open cells) that provides the desired amount of impedance to convection currents in the fluid. In some embodiments, the porous components of the present disclosure may be included in an insulating fluid in an amount of from about 8 pounds per barrel (lbs/bbl) to about 24 lbs/bbl, or alternatively from about 10 lbs/bbl to about 20 lb/bbl, or alternatively from about 12 lbs/bbl to about 15 lbs/bbl. The amount of porous components to include in an insulating fluid according to the present disclosure may vary depending on certain factors that will be apparent to those of skill in the art with the benefit of this disclosure, including but not limited to the temperature variations between an internal tubing and an external environment, the presence of other thermal control additives in the fluid, pumpability limits, and the like.

In certain embodiments, the insulating fluids used in the methods and systems of the present disclosure optionally may include any number of additional additives. Examples of such additional additives include, but are not limited to, salts, surfactants, corrosion inhibitors, scale inhibitors, catalysts, clay control agents, viscosifiers, weighting agents, relative permeability modifiers, resins, wetting agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers to provide even further impedance to convection currents. A person skilled in the art, with the benefit of this disclosure, will recognize the types of additives that may be included in the insulating fluids of the present disclosure for a particular application.

In some embodiments, the insulating fluids of the present disclosure may have a density of from about 0.5 grams per cubic centimeter (g/cc) to about 4.0 g/cc, alternatively from about 0.8 g/cc to about 3 g/cc, alternatively from about 1.0 g/cc to about 2.5 g/cc. The density may be measured by any suitable methodology.

In certain embodiments, the base fluid of the resulting insulating fluid may have a relatively low viscosity compared to that of existing insulating fluids. For example, the base fluid may have a dynamic viscosity of about 1 centipoise. This lower viscosity of the base fluid allows one or more parts of the insulating fluid to be easily recycled at the end of its use in a riser, packer, pipeline, or other insulating application. Upon pumping the insulating fluid back to the surface at the end of its use, the porous media may be easily removed by screening techniques (e.g., shakers) known by those skilled in the art. The recycled porous media, as well as the base fluid, may be separated and later reused with little or no further clean-up required. Even after a significant amount of operational time in the field, the porous media and base fluid can be easily pumped out and removed. The base fluid and the porous medium may each be environmentally safe and can therefore be safely disposed of if they will not be reused.

The insulating fluids of the present disclosure may be prepared using any suitable method and/or equipment (e.g., blenders, mixers, stirrers, etc.) known in the art at any time prior to their use. The insulating fluids may be prepared at least in part at a well site or at an offsite location. In certain embodiments, the porous media of the present disclosure and/or other components of the insulating fluid may be metered directly into a base fluid to form an insulating fluid. In certain embodiments, the base fluid may be mixed with the porous media of the present disclosure and/or other components of the insulating fluid at a well site where the insulating operation is conducted. In other embodiments, the insulating fluids of the present disclosure may be prepared, either in whole or in part, at an offsite location and transported to the site where the insulating operation is conducted. In introducing an insulating fluid of the present disclosure into an annulus, the components of the insulating fluid may be mixed together at the surface and introduced into the annulus together, or one or more components may be introduced into the annulus from the surface separately from other components such that the components mix or intermingle in a portion of the annulus to form an insulating fluid. In either such case, the insulating fluid is deemed to be introduced into at least a portion of the annulus for purposes of the present disclosure.

The present disclosure in some embodiments provides methods for using the insulating fluids to carry out certain insulating operations, including but not limited to, insulation of a fluid located within a first tubing from an environment at least partially surrounding the first tubing. In some embodiments, the insulating fluids of the present disclosure may be placed in an annulus between the first tubing and a second tubing (or the walls of a wellbore). If the environment is very cold, the insulating fluid protects the first fluid in the first tubing from the environment so that it can efficiently flow through the production tubing e.g., the first tubing, to other facilities. In some embodiments, the insulating fluid may be used as a riser fluid within a riser connecting a subsea wellhead to a floating platform or vessel. In other embodiments, the insulating fluid may be used as a packer fluid in an annulus between a production tubing and a casing or a wellbore wall. In still other embodiments, the insulating fluid may be used as a pipeline insulating fluid in an annulus between a flowline portion of the pipeline and an external surface of the pipeline exposed to a cold environment. In some embodiments, the methods of the present disclosure may include introducing the insulating fluid within an annulus through which the transfer of heat may be desirably reduced or ceased. In some embodiments, the insulating fluid may be introduced into the annulus between the first tubing having a relatively hotter fluid flowing therethrough and a colder external environment to reduce or prevent cooling of the fluid flowing through the first tubing. In certain embodiments, the porous media incorporated into the insulating fluid reduces or prevents convection currents from flowing through the annulus, thereby reducing or preventing convective heat transfer to the inner tubing.

After the porous media components of the present disclosure have performed their function in reducing convection currents through the annulus, in some embodiments, they may remain in the annulus or may be removed from the annulus through any suitable means. In some embodiments, the insulating fluid containing the porous media may be pumped out of the annulus, and one or more portions of the insulating fluid may be recycled for use in other applications. For example, the insulating fluid may be pumped out and the porous material may be separated from the base fluid, for example, via screening techniques. After this, the porous material may be utilized for another application, such as insulating other components at the same or a different work site, use as lost circulation materials, or other applications that will be recognized by those skilled in the art. The base fluid may also be reused, either with or without the porous material, for any variety of other applications as will be recognized by those skilled in the art.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments.

The porous media, fluids, and methods of the present disclosure may directly or indirectly affect one or more components or pieces of equipment associated with the preparation, delivery, recapture, recycling, reuse, and/or disposal of the compositions of the present disclosure. For example, the porous media, fluids, and methods may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the compositions of the present disclosure. The porous media, fluids, and methods of the present disclosure may also directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like. For example, and with reference to FIG. 1, the disclosed additives and/or fluids may directly or indirectly affect one or more components or pieces of equipment associated with an example of a wellbore production system 100, according to one or more embodiments. It should be noted that while FIG. 1 generally depicts a subsea well assembly, those skilled in the art will readily recognize that the principles described herein are equally applicable to land-based drilling operations, without departing from the scope of the disclosure.

Figure 1:
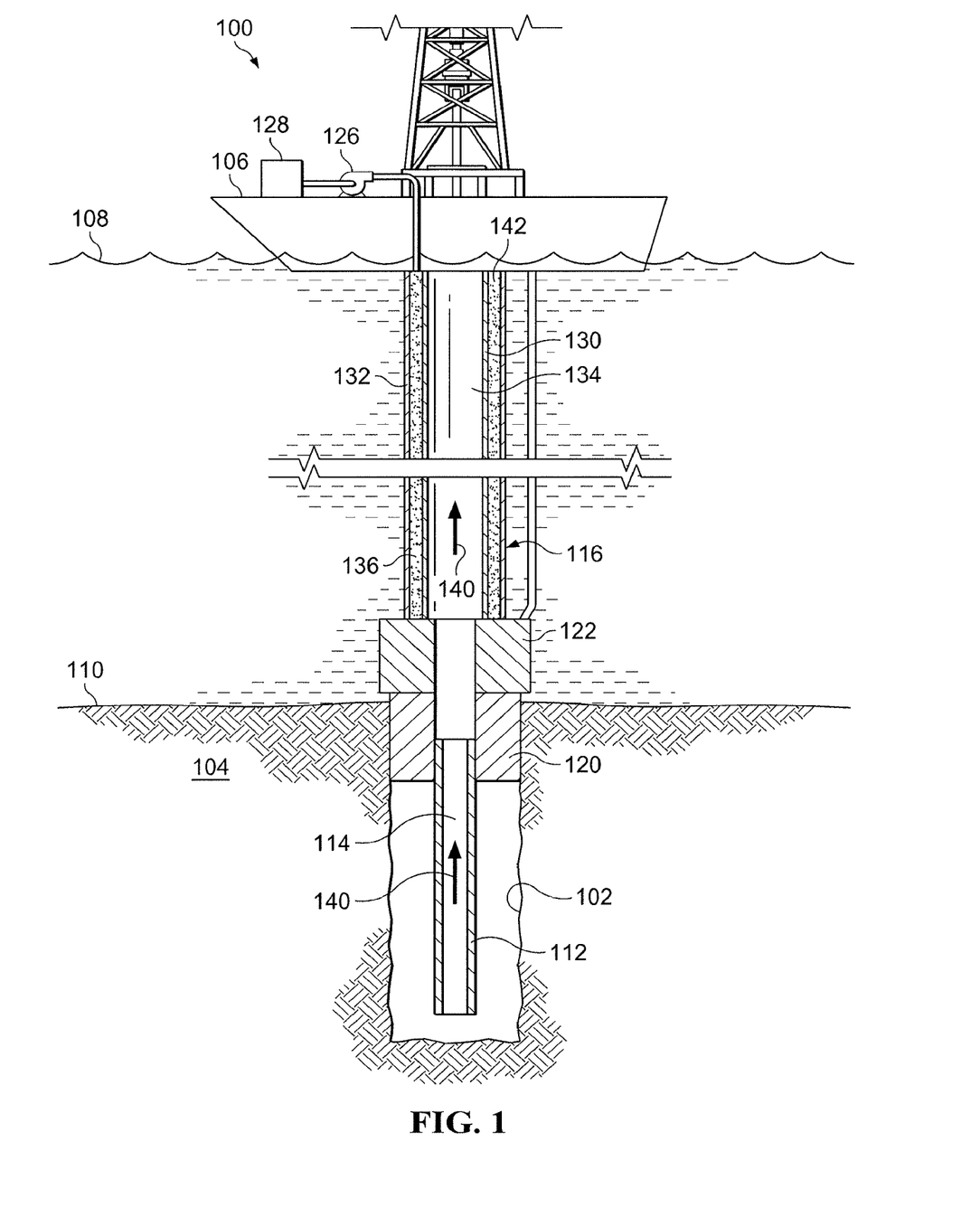
FIG. 1 is a diagram illustrating an example of an environment in which an insulating fluid may be used, in accordance with certain embodiments of the present disclosure.

As illustrated, the operating environment may include a wellbore 102 that penetrates a subterranean formation 104 for the purpose of recovering hydrocarbons. The wellbore 102 may be drilled into the subterranean formation 104 using any suitable drilling technique. For example, in an embodiment, a drilling or servicing rig may be located on an offshore floating platform 106 or drillship which may be partially submerged beneath the sea level 108. The wellbore 102 is drilled into the formation 104 beneath a sea bed 110. In such embodiments, the drilling or servicing rig may include a derrick with a rig floor through which various work strings (e.g., a drill string, a tool string, a segmented tubing string, a jointed tubing string, or any other suitable conveyance, or combinations thereof) generally defining an axial flowbore may be positioned within or partially within the wellbore 102. In certain embodiments, such a string may include two or more concentrically positioned strings of pipe or tubing (e.g., a first work string may be positioned within a second work string). The drilling or servicing rig may be conventional and may include a motor driven winch and other associated equipment for lowering the work string into the wellbore. Alternatively, any suitable type and/or configuration of drilling and/or servicing rig may be similarly employed. In such an embodiment, one or more of the various work strings may be utilized in drilling, stimulating, completing, or otherwise servicing the wellbore, or combinations thereof.

It is noted that although some of the figures may exemplify horizontal or vertical wellbores, the principles of the methods, apparatuses, and systems disclosed herein may be similarly applicable to horizontal wellbore configurations, conventional vertical wellbore configurations, and combinations thereof. Therefore, the horizontal and/or vertical nature of a portion of a wellbore illustrated within a given figure is not to be construed as limiting the wellbore to any particular configuration.

A marine riser 116 may extend from the floating platform or vessel 106 downward to a wellhead assembly 120 located at the sea bed 110. The marine riser 116 may include at least two concentric tubular walls, an inner wall 130 and an outer wall 132. The inner wall 130 defines an internal riser column 134 through which fluids will be produced, and the outer wall 132 defines an annulus 136 between the inner wall 130 and the outer wall 132 into which an insulating fluid will be provided in accordance with an embodiment of the present disclosure. In certain embodiments, the lower-most portion of the marine riser 116 may extend to, terminate at, and/or be secured to the subsea wellhead assembly 120, which may include a subsea tree having various components such as a blow-out preventer (BOP) or BOP stack 122. The BOP 122 may include any suitable configuration of valves, annular preventers, blind rams, shear rams, or combinations thereof. The BOP 122 may be located above and substantially at the sea bed 110, for example, the BOP 112 may be positioned substantially near (e.g., above, for example, directly above, the wellhead, wellbore casing, subsea tree, or the like).

In certain embodiments, portions or substantially all of the wellbore 102 may be cased, uncased, or combinations thereof. In embodiments where all or a portion of the wellbore 102 is cased with a casing string, portions or substantially all of the casing string may be secured into position within the wellbore 102 in a conventional manner using cement. In other embodiments, the casing string may be secured within the wellbore 102 utilizing a packer (e.g., permanent/retrievable mechanical or swellable packer), such as SWELLPACKER® (zonal isolation system, available from Halliburton Energy Services, Inc.).

The wellbore 102 may be drilled into the subterranean formation 104 as previously described herein. In certain embodiments, the drill string (not shown) may extend generally downward from the sea level 108 toward the sea bed 110 through and/or within the marine riser 116. After drilling and completing the wellbore 102, a production string 112 may be lowered through the marine riser 116 and lowered into/secured in the wellbore 102. The production string 112, which generally defines an axial flowbore 114, may extend downward from the wellhead assembly 120 (e.g., via a tubing hanger) into the wellbore 102 through the formation 104. In some embodiments, the production string 112 may extend substantially to the end (e.g., the "toe") of the wellbore 102, for example, substantially to the full depth of the wellbore 102. During production operations, the production string 112 may introduce fluids from the formation 104 into the axial flowbore 114, which continues upward through the riser column 134 terminating at the platform/vessel 106. This flow of production fluid is illustrated by arrows 140.

Throughout drilling, treatment, servicing, and production operations, it may be desirable to thermally insulate fluids moving up and/or down through the riser column 134 from relatively cold ambient temperatures outside the marine riser 116. To that end, an insulating fluid 142 having the porous media disclosed herein may be introduced into the annulus 136 surrounding the riser column 134. For example, in certain embodiments, the insulating fluid 142 may be introduced to the annulus 136 via the operation or one or more pumps 126, for example, which may be located on the platform 106 of the proximate support vessel.

The disclosed porous components may be added to a base fluid to form the insulating fluid at any location either on the platform 106 or at a remote onshore location before being brought to the platform 106. As an example, one or more of the disclosed porous media components may be added to the base fluid via a mixing hopper on the platform (or onshore) communicably coupled to or otherwise in fluid communication with a retention pit. The mixing hopper may include, but is not limited to, mixers and related mixing equipment known to those skilled in the art. In at least one embodiment, there could be more than one retention pit, such as multiple retention pits in series. Moreover, the retention pit may be representative of one or more fluid storage facilities and/or units where the disclosed porous media may be stored, reconditioned, and/or regulated until added to the insulating fluid.

As mentioned above, the disclosed fluids and/or porous media may directly or indirectly affect the components and equipment of the wellbore production system 100. For example, the disclosed fluids and/or porous media may directly or indirectly affect fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, and the like. The fluid processing unit(s) 128 may further include one or more sensors, gauges, pumps, compressors, and the like used to store, monitor, regulate, and/or recondition the disclosed fluids and/or porous media.

The disclosed fluids and/or porous media may directly or indirectly affect the pump 126, which representatively includes any conduits, tubulars, and/or pipes used to fluidically convey the fluids and/or porous media into the annulus 136, any pumps, compressors, or motors used to drive the fluids and/or porous media into motion, any valves or related joints used to regulate the pressure or flow rate of the fluids and/or porous media, and any sensors (i.e., pressure, temperature, flow rate, etc.), gauges, and/or combinations thereof, and the like. The disclosed fluids and/or porous media may also directly or indirectly affect any mixing hopper and retention pit and their assorted variations.

The disclosed fluids and/or porous media may also directly or indirectly affect the various riser components that may come into contact with the fluids and/or porous media. The disclosed fluids and/or porous media may also directly or indirectly affect any subsea heat exchangers, valves and corresponding actuation devices, tool seals, packers and other wellbore isolation devices or components, and the like associated with the wellbore 102.

While not specifically illustrated herein, the disclosed fluids and/or porous media may also directly or indirectly affect any transport or delivery equipment used to convey the fluids and/or porous media to the wellbore production system 100 such as, for example, any transport vessels, conduits, pipelines, trucks, tubulars, and/or pipes used to fluidically move the fluids and/or porous media from one location to another, any pumps, compressors, or motors used to drive the fluids and/or porous media into motion, any valves or related joints used to regulate the pressure or flow rate of the fluids and/or porous media, and any sensors (i.e., pressure and temperature), gauges, and/or combinations thereof, and the like.

Once positioned in the annulus 136, as illustrated, the disclosed insulating fluid 142 may reduce or prevent convection currents from flowing therethrough. During production operations, hot production fluid flowing through the riser column 134 will tend to heat the inner wall 130, and as the annulus fluid at the inner wall heats up it will expand, and its density will decrease. The density decrease causes the fluid to rise at this boundary. Similarly, cold ambient temperatures outside the riser 116 tend to cool down the outer wall 132, so that the annulus fluid at the outer wall cools down and its density increases. The density increase causes the fluid to move downward at the outer wall boundary. As this process continues, natural convection currents are established in the annular fluid.

In these situations, the convective heat transfer coefficient can be approximated by the Nusselt (Nu) number, which is defined in Equation 1 below.

$$\overline{Nu_L} = \text{function }(Ra, Pr) = \frac{\overline{h}*L}{k} \qquad \text{(Equation 1)}$$

where Ra is the Rayleigh number, Pr is the Prandtl number, $\overline{h}$ is convective heat transfer coefficient, L is vertical height, and k is thermal conductivity. For isothermal vertical walls, the correlation shown in Equation 2 below is useful for understanding why changing the rheology of the insulating fluid can dramatically impact heat transfer.

$$\overline{Nu_L} = 0.68 + 0.67 * Ra_L^{\frac{1}{4}} * \left[1 + \left(\frac{0.492}{Pr}\right)^{9/16}\right]^{-4/9} \qquad \text{(Equation 2)}$$

The Rayleigh number, Ra, is defined by the following relationship:

$$Ra_L = \frac{g*\beta*\Delta T*L^3}{\alpha*\nu} \qquad \text{(Equation 3)}$$

where g is the acceleration constant, β is thermal expansion coefficient, ΔT is differential temperature of an isothermal wall and the far field, α is thermal diffusivity, and ν is kinematic viscosity. On inspection of the Rayleigh number, one can ascertain that as ν approaches 0, the heat transfer $\overline{h}$ will approach infinity and conversely as ν approaches infinity, the heat transfer will go to a very small number. Thus, the basis for the disclosed insulating fluids is to minimize convection currents by either increasing the fluid's viscosity and/or by changing the convection path such that the impeded flow resistance produces the same (or enhanced) results as increasing the fluid's viscosity.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLE

The following example uses reticulated polyurethane foam in a base fluid for use as an insulating fluid.

Figure 2:
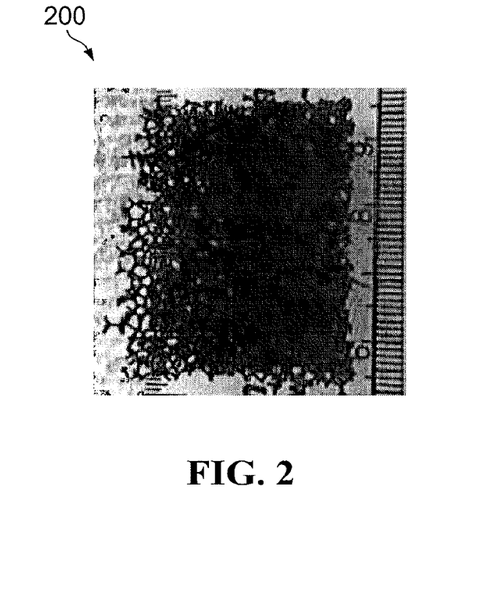
FIG. 2 is a photograph illustrating reticulated foam that may be used in an insulating fluid, in accordance with certain embodiments of the present disclosure.

In this example, an insulating fluid containing reticulated foam is used to reduce heat transfer through the insulating fluid by reducing or preventing convection currents through the fluid. The reticulated foam is BAROLOCK® 666, made from polyurethane. FIG. 2 is a photograph of a piece of that reticulated foam 200 placed against a ruler. It should be noted that the material is available in a variety of pore sizes other than that shown in FIG. 2.

To demonstrate the potential of the reticulated foam 200 for impacting convection currents in an aqueous base fluid, the foam was tested via the following method. A graduated cylinder was placed in a Petri dish containing a volume of silicon oil. The volume of silicon oil was just enough to cover a base of the graduated cylinder. A temperature probe was placed at the top of the graduated cylinder. In the control case, the cylinder was filled with water (with no additional porous media added). In the insulating case, reticulated foam was placed in the cylinder, and then the graduated cylinder was filled to the same level with water. A hot plate was set to 300 degrees F. Once the hot plate reached the temperature set point, the complete assembly of Petri dish and graduated cylinder was placed on the hot plate. The temperature of the fluid (water) at the top of the graduated cylinder was monitored continuously to detect the heat transfer through the fluid via convection currents.

Figure 3:
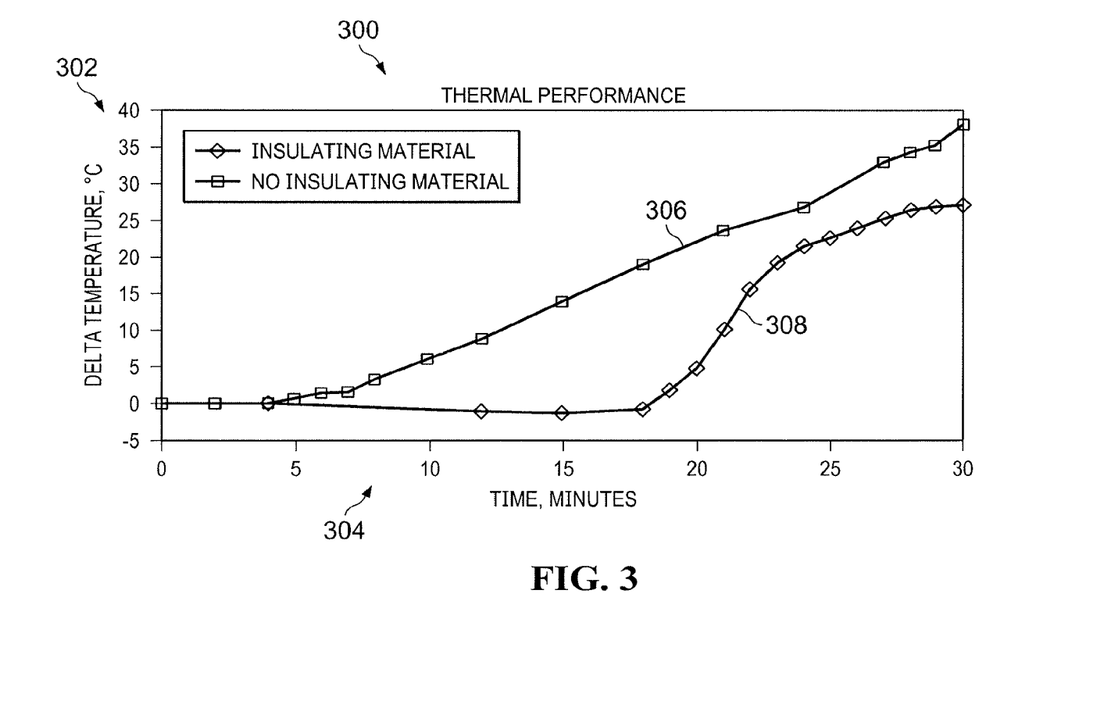
FIG. 3 is a plot illustrating thermal performance of an insulating fluid over time, in accordance with certain embodiments of the present disclosure.

FIG. 3 is a plot 300 illustrating the resulting detected temperature 302 (degrees Celsius) taken with respect to time 304 (minutes) for both test cases. A first trace 306 follows the temperature detected for the control case where no reticulated foam was used, while a second trace 308 follows the temperature detected for the insulating case where the reticulated foam was used. As shown, in both cases the temperature increases over time. However, the fluid in the insulating test case with the reticulated foam 308 did not heat up as fast as the control case 306. It also appeared that the reticulated foam test case 308 achieves a steady state temperature toward the end of the test, while the temperature in the control case 306 appeared to still increase with time. This evidence clearly shows the advantage of the convection current impeding reticulated foam material in insulating fluids.

Figure 4:
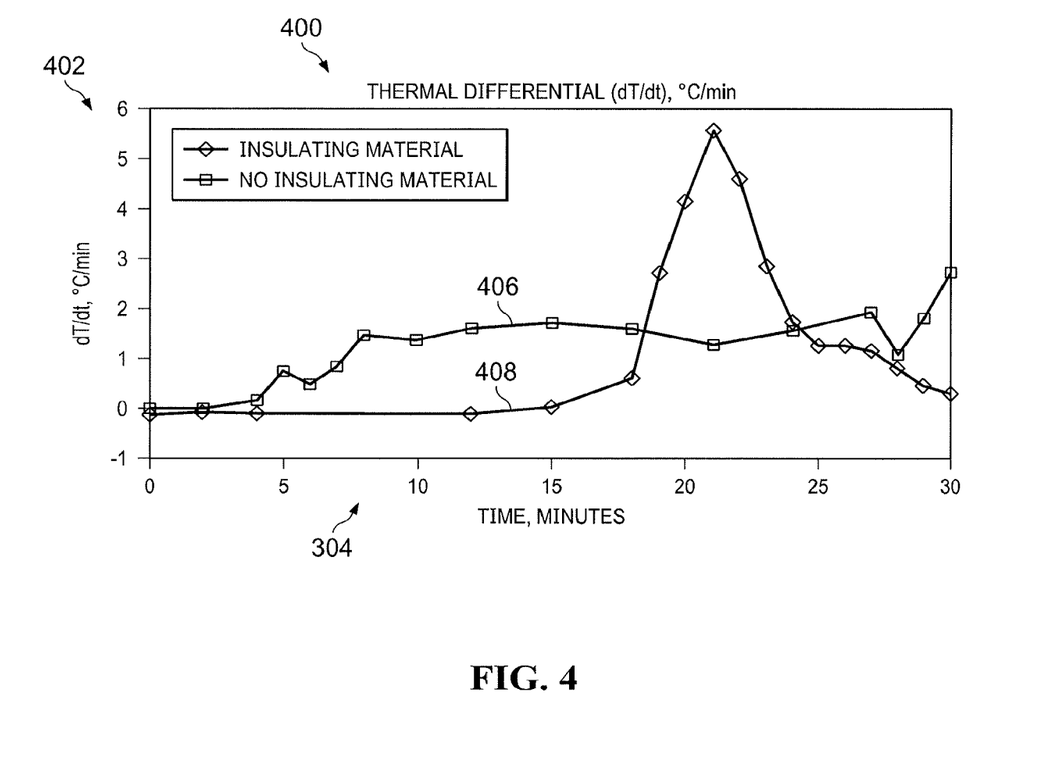
FIG. 4 is a plot illustrating a time differential of the thermal performance of FIG. 3, in accordance with certain embodiments of the present disclosure.

FIG. 4 is a plot 400 illustrating the time derivative 402 (degrees Celsius per minute) of the temperature measurements of FIG. 3 taken with respect to time 304 (minutes) for both test cases. A first trace 406 follows the time derivative of temperature detected for the control case where no reticulated foam was used, while a second trace 408 follows the time derivative of temperature detected for the insulating case where the reticulated foam was used. In this plot 400, the derivatives for the reticulated foam case 408 clearly show a generally low rate of temperature change and support the notion that the reticulated foam case 408 is approaching steady state while the temperature in the control case 406 is still rising at the end of the test.

An embodiment of the present disclosure is a method including: providing an insulating fluid that includes a base fluid and a porous medium having a plurality of open cells; introducing the insulating fluid into an annulus at least partially surrounding a tubing; and allowing the porous medium to at least partially impede convection currents within the insulating fluid.

In one or more embodiments described in the preceding paragraph, at least partially impeding the convection currents within the insulating fluid reduces heat transfer between an environment external to the annulus and fluid flowing through the tubing. In one or more embodiments described above, the porous medium includes a reticulated foam. In one or more embodiments described above, the porous medium includes a cellulosic sponge. In one or more embodiments described above, the porous medium includes a base foam or sponge and a coating disposed on at least a portion of an outer surface of the base foam or sponge. In one or more embodiments described above, the coating includes calcium carbonate. In one or more embodiments described above, the method further includes allowing the base foam or sponge to at least partially melt in response to a temperature exceeding a threshold, leaving the coating as an exoskeleton shell that at least partially impedes the convection currents within the insulating fluid. In one or more embodiments described above, the base fluid is an oil-based fluid, a water-based fluid, or a brine-based fluid. In one or more embodiments described above, the base fluid has a thermal conductivity of from about 0.12 W/mK to about 0.6 W/mK. In one or more embodiments described above, the porous medium is in a compressed state during introduction of the insulating fluid into the annulus. In one or more embodiments described above, the method further includes: removing the insulating fluid from the annulus after impeding the convection currents; and after removing the insulating fluid, reusing the base fluid, the porous medium, or both. In one or more embodiments described above, the insulating fluid includes multiple components made of the porous medium, wherein each of the components are shaped as cubes having a dimension of about 0.5 inch to about 1.0 inch.

Another embodiment of the present disclosure is a system including: a first tubing; an annulus between the first tubing and a second external tubing or wellbore wall; and an insulating fluid disposed in the annulus, wherein the insulating fluid includes a base fluid and a porous medium having a plurality of open cells, wherein the plurality of open cells at least partially impede convection currents within the base fluid.

In one or more embodiments described in the preceding paragraph, the first tubing and the annulus form a portion of a subsea riser, a packer assembly, or a pipeline.

Another embodiment of the present disclosure is an insulating fluid including: a base fluid; and a porous medium including a base foam or sponge having a plurality of open cells and a coating disposed on at least a portion of an outer surface of the base foam or sponge.

In one or more embodiments described in the preceding paragraph, the porous medium has the same specific gravity as the base fluid. In one or more embodiments described above, the base foam includes a reticulated foam. In one or more embodiments described above, the coating includes calcium carbonate. In one or more embodiments described above, the base sponge includes a cellulosic sponge. In one or more embodiments described above, the base fluid has a dynamic viscosity of about 1 centipoise.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing an insulating fluid that comprises a base fluid and a porous medium having a plurality of open cells;
   introducing the insulating fluid into an annulus at least partially surrounding a tubing; and
   allowing the porous medium to at least partially impede convection currents within the insulating fluid,
   wherein the porous medium comprises a base foam or sponge and a coating disposed on at least a portion of an outer surface of the base foam or sponge and
   wherein the coating comprises calcium carbonate.

2. The method of claim 1, wherein at least partially impeding the convection currents within the insulating fluid reduces heat transfer between an environment external to the annulus and fluid flowing through the tubing.

3. The method of claim 1, wherein the porous medium comprises a reticulated foam.

4. The method of claim 1, wherein the porous medium comprises a cellulosic sponge.

5. The method of claim 1, further comprising allowing the base foam or sponge to at least partially melt in response to a temperature exceeding a threshold, leaving the coating as an exoskeleton shell that at least partially impedes the convection currents within the insulating fluid.

6. The method of claim 1, wherein the base fluid is an oil-based fluid, a water-based fluid, or a brine-based fluid.

7. The method of claim 1, wherein the base fluid has a thermal conductivity of from about 0.12 W/mK to about 0.6 W/mK.

8. The method of claim 1, wherein the porous medium is in a compressed state during introduction of the insulating fluid into the annulus.

9. The method of claim 1, further comprising:
   removing the insulating fluid from the annulus after impeding the convection currents; and
   after removing the insulating fluid, reusing the base fluid, the porous medium, or both.

10. The method of claim 1, wherein the insulating fluid comprises multiple components made of the porous medium, wherein each of the components are shaped as cubes having a dimension of about 0.5 inch to about 1.0 inch.

11. The method of claim 1, wherein the tubing and the annulus form a portion of a subsea riser, a packer assembly, or a pipeline.

12. The method of claim 1, wherein the porous medium has the same specific gravity as the base fluid.

13. The method of claim 1, wherein the base fluid has a dynamic viscosity of about 1 centipoise.

14. A system, comprising:
   a first tubing;
   an annulus between the first tubing and a second external tubing or wellbore wall; and
   an insulating fluid disposed in the annulus, wherein the insulating fluid comprises a base fluid and a porous medium having a plurality of open cells, wherein the plurality of open cells at least partially impede convection currents within the base fluid,
   wherein the porous medium comprises a base foam or sponge and a coating disposed on at least a portion of an outer surface of the base foam or sponge and
   wherein the coating comprises calcium carbonate.

15. The system of claim 14, wherein the first tubing and the annulus form a portion of a subsea riser, a packer assembly, or a pipeline.

* * * * *